Feb. 10, 1970    L. MIR    3,494,103
CHROMATOGRAPHIC METHOD AND APPARATUS
Filed July 9, 1968    2 Sheets-Sheet 1

INVENTOR
LEON MIR
BY
*Crowley, Kiely, & Simon*
ATTORNEYS

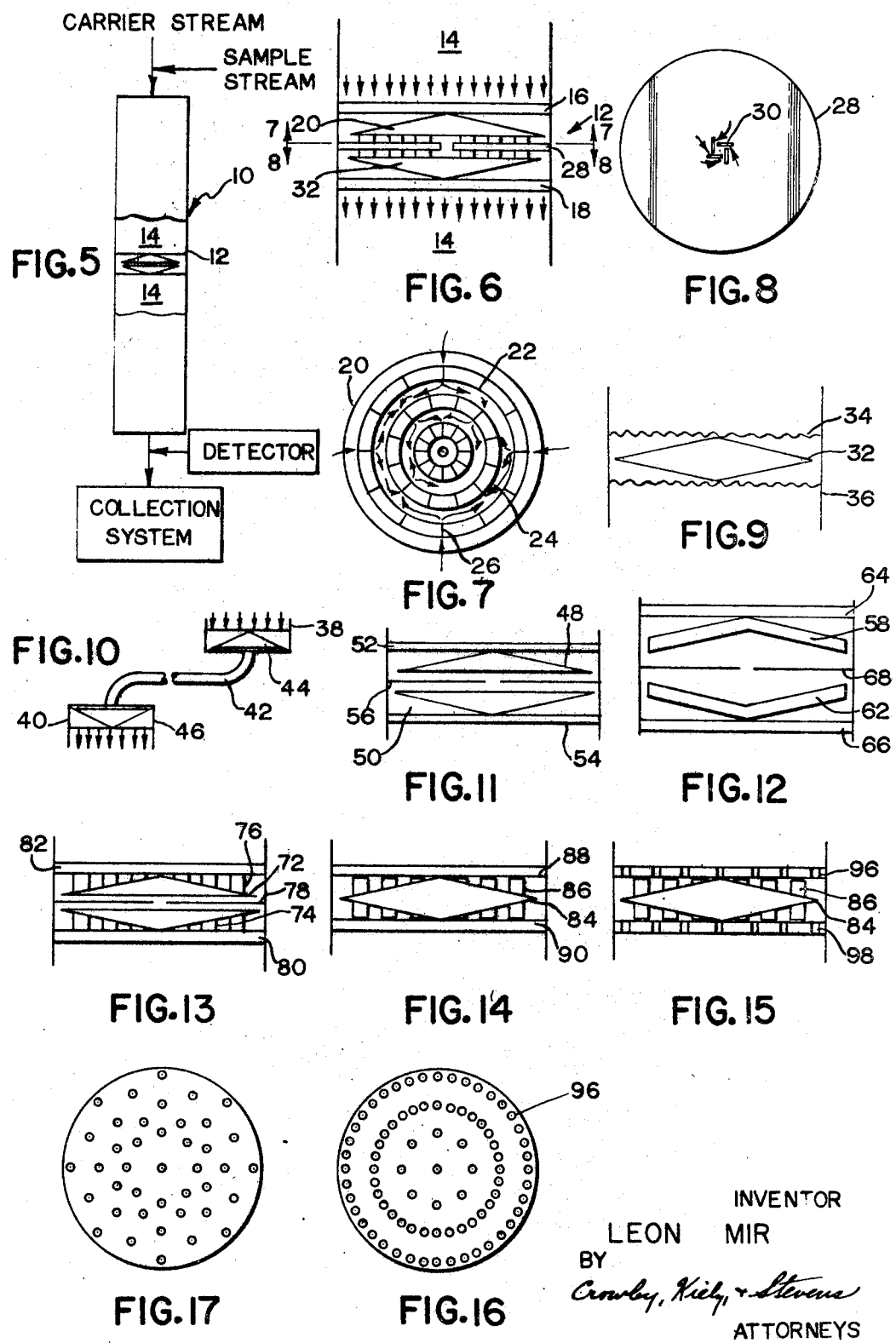

United States Patent Office 3,494,103
Patented Feb. 10, 1970

3,494,103
CHROMATOGRAPHIC METHOD AND APPARATUS
Leon Mir, Brookline, Mass., assignor to Abcor, Inc., Cambridge, Mass., a corporation of Massachusetts
Filed July 9, 1968, Ser. No. 743,417
Int. Cl. B01d 15/08
U.S. Cl. 55—67          12 Claims

ABSTRACT OF THE DISCLOSURE

A baffle unit for chromatographic columns which comprises a first baffle element characterized by a conical upstream surface and a ring-like peripheral flow passage. The apex of the conical surface is adjacent a sieve plate. The sieve plate and the conical surface define a flow space which increases in volumetric area toward the column wall. On the opposite surface of the element is a labyrinth of alternating ridges and grooves to permit angular spreading and mixing of the fluid streams. Disposed below the element is a mixing plate having a central flow passage followed by a second baffle element which is the mirror image of the first element. A fluid stream flows against the upstream conical surface and through the ring-like flow passage. The conical surface insures that the velocity of the fluid stream in any radial position is constant whereby the pressure drop across the sieve plate is constant. The fluid stream then passes through the labyrinth and then into the flow passage of the mixing plate across the labyrinth of the second element through the ring-like flow passage and over the conical surface of the second element. This insures a uniform pressure drop across the second sieve plate.

Background of the invention

In the chromatographic separation of components in a fluid stream one of the difficulties initially encountered, particularly on a large scale, was the tendency of the columns to lose their resolving power and separatory ability as the diameter of the column increased. This loss in separatory ability was generally attributed to channeling of the fluid stream especially near the walls of the packed bed of the chromatographic column.

To inhibit this channeling and promote mixing of the fluid stream moving axially through the column, baffles have been employed to improve the resolving power of the column.

Chromatographic columns particularly the large diameter columns employing baffles have been described in U.S. Patent Nos. 3,250,058 and 3,374,606, issued to Raymond F. Baddour. These patents describe a combination of obstructors or baffle elements in chromatographic columns which elements are designed to induce radial or lateral mixing of the fluid streams periodically in the column and then redistribute such radially mixed streams into the next succeeding zone of separatory material in the column.

United Kingdom specification 24,449/66 has also described a particular embodiment of a baffle device wherein a pair of sieve plates are axially spaced apart within a chromatographic column to define a mixing space without separatory material therein. Further, a doughnut type plate element is inserted in the mixing space whereby the resolving power of the column is improved. Further, United States patent application, Ser. No. 644,313, filed June 7, 1967, now abandoned, and assigned to Abcor, Inc., the common assignee of the Baddour patents, has described the use of ridges or grooves on the surface of various baffles to confine and control the flow of fluid streams on the baffle surface while passing through a chromatographic column.

Although the above embodiments have greatly improved the resolving power of the column in which they are employed, the mixing of the fluid streams is not always as complete as desired and at times the pressure drop across a combination of baffles is significant and disturbs the uniform flow of the fluid stream moving axially through the column, that is the column flow.

Most baffle arrangements commonly used today achieve the mixing of the fluid stream by passing the fluid stream through a reduced orifice relative to the cross-sectional area of the column. Typically a plate element having a central flow passage is used. This sudden reduction in cross-sectional area causes a sharply varying velocity profile in the fluid stream across the column. This results in an uneven column flow since the velocity near the column wall is very small and the velocity of the fluid passing through the channel may even increase, thus lowering the pressure at the center. These pressure variations across the column cause uneven velocity profiles in the fluid streams both when entering and leaving the baffle arrangement which disturbs the column flow.

Summary of the invention

The present invention is directed to a novel baffle designed for use in both gas and liquid chromatographic columns. The invention is particularly directed to the employment of an improved baffle unit which in one embodiment provides for a baffle surface of a particular shape so that the velocity of any fluid stream in any radial position on the surface of the baffle is relatively constant. It has been found that constant radial velocities across the surface of baffles are most desirable in order that the pressure drop be generally constant thereby providing for uniform flow into and out of the baffle unit employed in the column.

As described above, chromatographic baffles presently employed today mix the fluid stream by flowing it through a reduced cross-sectional area relative to the column diameter. This provides less and less radius for more and more flow as the fluid stream forces its way through the orifice. As shown in FIG. 1 a doughnut-type mixing place is spaced apart from a sieve plate to define a disc-like flow space. As the fluid stream moves through the column and into the flow space the entire volume must flow through the central flow passage which creates significant velocity variations in the flow space. As indicated, the velocities $v_0$ at or near the wall are at a minimum and at a maximum in the center $v_m$. This creates uneven pressures and disrupts the column flow. The same results occur as shown in FIG. 2 where a partition element having a ring-like flow passage is used. As the fluids enter the flow space it must handle more and more flow toward the peripheral flow passage. The reduced cross-sectional area must accept the fluid flow of the entire column and again as indicated by the arrows an uneven velocity profile occurs. Some baffles such as shown in FIG. 3 are tapered inwardly toward a central flow passage (see U.S. Patent No. 3,230,167) which provides a flow space of slightly increasing volumetric area toward the orifice. However, the same problem as shown in FIG. 1 is present.

My invention as shown in one embodiment in FIG. 4 provides for a flow space which increases in volumetric area toward the column wall. A baffle element having a conical surface is disposed below a sieve plate to define the flow space. As described above the reduced cross-sectional area in the baffle element must accept the volumetric flow of the entire column. In the embodiment shown, it is obvious that as the fluid streams move toward the column wall more and more volumetric flow must be handled and to insure that the velocity on the conical surface is constant more and more volumetric area to handle the increased flow must be provided. Further, the volumetric area should be directly proportional to the amount of increased flow. Therefore, the conical surface of the baffle element in combination with the sieve plate provides the additional volumetric area to handle the increased flow. As shown in FIG. 4 the velocity at the apex of the conical surface is at a minimum $v_o$. However, across the baffle element the velocity remains constant $v_c$. As the volumetric flow increases the flow space to handle such additional flow also increases as represented by areas A and A'.

Briefly, my invention provides for a baffle element characterized by a contoured surface which diverges from the column axis toward the column wall, such as a conical surface to provide an increased surface area to accept more flow and to direct the fluid stream toward one or more flow passages about the periphery of the element. This conical surface provides constant velocities at any radial point on the surface. The constant velocity results in uniform pressure and therefore uniform flow. Typically, the apex of the element is disposed just adjacent a planar surface having flow passages therein such as a screen, sieve plate or sintered plate. The planar surface and the conical surface define a flow space which increases in volumetric area toward the column wall. The fluid streams flow over the conical surface and through the peripheral flow passage of the baffle element which element may be spaced apart from the interior wall of the column to define a ring-like flow passage. The baffle element may also be sealingly engaged to the column wall and have a plurality of peripheral flow passages therein, such as holes, semi-circles, slots, etc. After the fluid stream passes through the peripheral flow passage it may then be more thoroughly mixed in a conventional manner by passing it through a doughnut-type partition element or mixed as described hereafter.

If a baffle unit is disposed between successive sections of packing material then generally a baffle element having a conical surface, normally identical to an upstream baffle element, is disposed below the upstream baffle element with or without an intermediate mixing plate between elements. The apex of the conical surface of the downstream baffle element is adjacent the next succeeding section of packing material. That is the downstream baffle element is generally the mirror image of the upstream baffle element both functionally and structurally. The fluid stream flow through the peripheral flow passage of the downstream baffle element and across the conical surface.

Therefore, with my baffle design the velocity of the column flow into and from any baffle arrangement may be kept generally uniform regardless of the type of mixing if any between the conical surfaces. Any uneven flow velocities between the conical surfaces such as may be created by a mixing with a doughnut-type partition element will not affect the column flow.

In another embodiment, the present invention is directed to a baffle element which contains a particular series of fluid flow obstructors to promote the lateral or radial movement of the fluid such as a series of alternating grooves and ridges together with flow passages whereby the fluid sample stream flowing through radial flow passages is continually split or broken up and spread through a system of grooves defined by the ridges. A predetermined degree of angular spreading through the circumferential labyrinth provides good lateral or angular mixing of the fluid sample stream.

Brief description of the drawings

FIG. 5 is a schematic illustration of my invention employed in a chromatographic column;
FIG. 6 is an enlarged cross-sectional view of a baffle device of the present invention;
FIG. 7 is a plan view of the device of FIG. 6 taken along lines 7—7;
FIG. 8 is a plan view of the device of FIG. 6 taken along lines 8—8;
and
FIGS. 9 through 19 are alternative embodiments of my invention.

Description of the preferred embodiments

Figure 1:
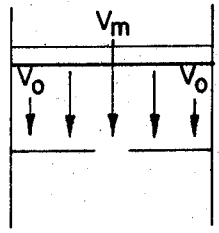
FIGS. 1 through 3 are schematic illustrations of prior art baffle elements.

FIG. 5 shows a baffle unit 12 disposed within a chromatographic column 10 between successive sections of packing material 14. The unit 12 is shown in greater detail in FIGS. 6, 7 and 8. In FIG. 6 sieve plates 16 and 18 are disposed upstream and downstream of the baffle unit 12. The unit 12 comprises an upstream baffle element 20 characterized by a conical surface which provides for outward flow of the fluid stream. The conical surface of the element and the sieve plate 16 define a flow space which increases in volumetric area toward the column wall. The cone angle may range from a few minutes of a degree to just less than 90 degrees. However, a maximum of 45 degrees is generally more than adequate for most operations and a range of from about 2 to 10 degrees, say around 4 degrees is suitable for most purposes. The cone angle shown in the drawings has been made greater than four degrees for the sake of clarity.

The peripheral edge of the element 20 is less than the internal diameter of the column and forms a ring-like flow passage therewith. On the underside of the element 20 as shown more clearly in FIG. 7 are a plurality of alternating circumferential grooves 24 and ridges 22. Along the circumferential ridges 24, are flow passages 26 which lie on radial lines 30 degrees apart. The flow passages 26 of the first and third ridges are offset from the flow passages of the second ridge by about 15 degrees. Of course, if desired, any number of ridges and grooves may be used and the flow passages in the ridges may be spaced apart in any geometric or random pattern.

A generally flat mixing plate 28 having a central flow passage therein is disposed below the element 20 and in contacting engagement with the ridges 22. As shown in FIG. 8 about the flow passage are a plurality of flow obstructors 30 on the upstream face of the plate which impart a tangential velocity to the fluid stream flowing toward the central flow passage. Similar flow obstructors are also disposed on the downstream side of the plate 28.

A baffle element 32 which is identical to element 20 is placed downstream of the plate 28, and has a similar pattern of ridges 22, grooves 24 and flow passages 26. The conical surface of the element 32 and the sieve plate 18 define a flow space and the apex of the element 32 is adjacent the surface of the sieve plate 18.

The operation of my invention will be described with reference to the chromatographic separation of proteins from a concentrated ammonium sulfate solution. The carrier stream is an aqueous buffer solution with a pH of about 7.5. The packing material used is a porous gel packing such as Sephadex G-25®. Although the operation will be described with reference to liquid chromatography, it is obvious my invention applies equally well to gas chromatography and the type packing or carrier stream used, and the components to be separated do not affect my invention.

Referring to FIG. 5, the sample stream of ammonium sulfate and proteins is introduced into the column 10, followed by the carrier fluid. As the sample and carrier streams move axially through the column packing 14, the ammonium sulfate is selectively retarded by the porous gel packing.

Turning now to FIG. 6, the carrier and sample streams approach the sieve plate 16 as indicated by the arrows. The carrier and sample streams move through the sieve plate 16 and strike the conical surface of the baffle element 20. The flow space defined by the conical surface of the baffle element provides a greater volumetric area for the fluid streams and insures that the velocity of the fluid streams in any radial position on the conical surface is constant. The constant velocity on the conical surface of element 20 insures that the pressure drop across the element 16 is uniform and therefore the column flow above the sieve plate 16 is not disturbed and remains uniform, as indicated by the arrows.

Upon striking the conical surface of the element 20, the fluid streams flow radially outward to the peripheral edge of the element 20 and flow through the ring-like flow passage defined by the peripheral edge of the element 20 and the interior diameter of the column 10. After flowing through the ring-like flow passage the fluid streams strike the plate 28 and flow inwardly toward the central flow passage therein. As shown more clearly in FIG. 7, the fluid stream, and as indicated by the arrows, strikes the outermost ridge and flows through the flow passage 26. After passing through the flow passages the fluid streams then strike the next inner ridge, split and then flow along the groove 24 until they reach the next flow passages 26 where they mix with the fluid stream discharged from the next succeeding flow passage. This angular spreading and mixing of the fluid stream is continued until they reach the flow obstructors 30 on the plate 28. As shown, the fluid stream entering one flow passage is spread and mixed angularly through 120 degrees. As shown in FIGS. 6 and 8, the flow obstructors 30 are tangentially disposed about the flow passage of the plate 28 and fit within the area defined by the innermost ridge on the baffle element 20. The flow obstructors 30 impart a tangential velocity to the fluid streams striking their surfaces and create a helical flow pattern for the streams flowing through the central flow passage.

After the fluid streams have passed through the central flow passage, the flow obstructors 30 on the downstream side of the plate 28 impart a similar tangential velocity to the fluid streams to direct them outwardly toward the peripheral edges of the element 32. The fluid streams flow outwardly from the center of the element 32 and are subjected to the same angular spreading and mixing as before only in an outwardly direction. As indicated by the arrows in FIG. 7 on the downstream side of the element 28, when the fluid streams reach the peripheral edge of the element 32 they enter the flow space while moving across the conical surface of the element 32. As before, the velocity of the fluid streams in any radial position on the conical surface of the element 32 is constant. Since the velocities across the conical surface are constant the pressure is constant and the flow from the flow space through the sieve plate and back into the next succeeding section of the column is uniform as indicated by the arrows. The fluid streams may pass through one or more baffle units such as shown and described prior to collection.

In some chromatographic systems it may be necessary only to insure that the column flow throughout the column is uniform and additional plates or flow obstructors to mix the fluid streams moving axially through the columns may not be necessary. In FIG. 9 a baffle unit 32 is shown as a unitary element between two supporting screens 34 and 36, and the upstream and downstream surfaces are conical as described above but there is no specific mixing elements between the upper and lower conical surfaces. In this embodiment enough radial mixing may be achieved solely by the flow across the conical surfaces.

It is known that in many instances successive chromatographic columns are used in series for a chromatographic separation. FIG. 10 shows two chromatographic columns 38 and 40 in serial relationship connected by an empty mixing tube 42. However, if desired, the mixing tube may or may not contain separatory material therein. Baffle elements 44 and 46 according to my invention are disposed just prior to the outlet of the column 38 and at the inlet of the column 40 to insure uniform flow from and into the columns 38 and 40.

Figure 2:
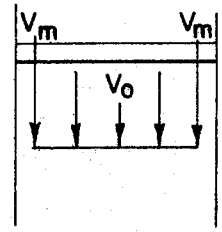
Figure 3:
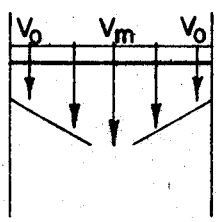
Figure 4:
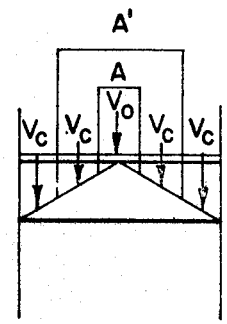
FIG. 4 is a schematic illustration of my invention.

Another embodiment of my invention is shown in FIG. 11 wherein two baffle elements 48 and 50 are disposed between two sieve plates 52 and 54. A mixing plate 56 having a central flow passage therein is disposed between the two baffle elements 48 and 50. This embodiment is similar to that shown in FIG. 2 but there are no ridges or grooves on the surfaces of the elements adjacent the mixing plate 56.

As previously discussed, it is important that the column flow into and out of the baffle unit be generally uniform and that the velocities between the upstream and downstream conical surfaces, that is, the mixing area such as shown in FIG. 6 may have uneven velocities since this mixing area does not affect the column flow into and out of the baffle unit. However, if desired, each baffle element may have an upstream and downstream conical surface such as shown in FIG. 12, wherein two chevron-type baffle elements 58 and 62, each with an upstream and downstream conical surface are disposed between two sieve plates 64 and 66. A mixing plate 68 is disposed between the elements 58 and 62. This embodiment insures a generally uniform flow in the mixing area which is defined by the downstream conical surface of the element 58 and the upstream conical surface of the element 62.

FIG. 13 shows two baffle elements 72 and 74 having ridges 76 on the conical surface thereof. The baffles are disposed between sieve plates 80 and 82 and are on opposite sides of a mixing plate 78. In this embodiment the fluid streams are radially mixed as they pass through the ridges and grooves on the conical surfaces which are similar to those shown in FIG. 6. FIG. 14 shows a unitary baffle element 84 which has an upstream and downstream conical surface and ridges 86 are disposed on said surfaces in a similar manner as the ridges shown in FIG. 6. The baffle element 84 is disposed between sieve plates 88 and 90.

FIG. 15 shows the baffle element 84 in FIG. 14 disposed between two sieve plates 96 and 98 having a plurality of flow passages therein. The flow passages in the sieve plates are shown in FIG. 16 in a generally geometric pattern. The circumferential flow passages are disposed directly above the grooves and the fluid stream passes through the flow passages in the sieve plates 96 directly into the grooves defined by the ridges 86 and flows radially outward as described before.

Figure 18:
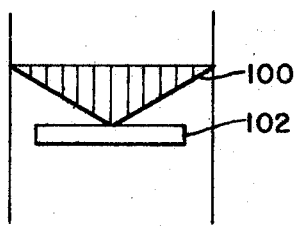
Figure 19:
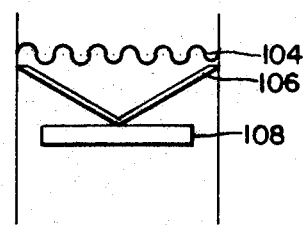

FIG. 18 shows a still further embodiment of my invention wherein an upstream sieve plate 100 is conical and the apex is adjacent a disc-type baffle element 102. FIG. 19 shows a supporting screen 104 upstream of a V-shaped sieve plate 106. The apex of the sieve plate is adjacent a disc-type baffle 108.

Although the baffle elements have been described as having a plurality of alternating ridges and grooves on either one or both surfaces thereof, it is of course within the scope of this invention to use any of other various arrangements of flow obstructors for the purpose of mixing the fluid streams flowing across the surface. Accordingly, the ridges and grooves may be arranged in a geometric pattern or not as desired. The ridges, although shown and described as defining uniform grooves may define nonuniform grooves, such as progressively larger grooves. Further, the flow passages in the ridges can be varied to provide various degrees of angular spreading. Another embodiment is shown in FIG. 17 where the planar surface of a mixing plate such as shown in FIG. 8 comprises a plurality of projections arranged from the surface thereof in a geometric pattern. This geometric pattern may also be arranged randomly if desired. Further, in the embodiment shown in FIG. 6 and the other embodiments shown in FIGS. 9-17, the ridges and grooves as flow obstructors have been shown generally as being part of the baffle elements. However, the ridges and grooves may be formed as part of the central mixing place where there is one.

The present invention has been described and illustrated in particular with the various embodiments of the baffle elements having conical surfaces and various arrangements of ridges and grooves. However, it is recognized that all or portions of one or more of the embodiments may be employed in various combinations in both gas and liquid chromatographic columns or in any fluid stream in other processing operations. Also, a variety of baffle combinations that will be apparent to those skilled in the art may be used in employing the concepts of this invention.

What I now claim is:

1. A baffle unit adapted for use in chromatographic columns which comprises in combination:
 a first baffle means comprising a plurality of flow passages substantially uniformly distributed throughout;
 a second baffle means secured to the first baffle means to form a unitary baffle unit therewith, the second baffle means defining in combination with the internal wall of the column in which the baffle unit is disposed a flow passage toward the outer periphery thereof;
 the first and second baffle means defining an empty flow space therebetween, the flow space characterized by an increasing volumetric flow space extending outwardly from the axial center of the baffle unit whereby a fluid stream introduced generally axially into the baffle device flows into the flow space and outwardly at a substantially constant velocity in the flow space, and then exits from the baffle unit, the pressure across the baffle unit being substantially uniform.

2. The baffle unit of claim 1 wherein the first baffle means is upstream of the second baffle means and has a generally planar surface and the second baffle means is characterized by a conical surface.

3. The baffle unit of claim 2 wherein the apex of the conical surface of the second baffle means is adjacent the planar surface of the first baffle means and the peripheral edge of the second baffle means is spaced apart from the internal wall of the column to define a ring-like flow passage therewith.

4. The baffle unit of claim 2 wherein the apex of the conical surface of the second baffle means is adjacent the planar surface of the first baffle means and the peripheral edge of the second baffle means is characterized by having a plurality of flow passages therein.

5. The baffle unit of claim 3 wherein the first baffle means is a sieve plate and the second baffle means is a cone-type baffle element, the downstream surface of said element characterized by a plurality of fluid flow obstructors thereon, and a doughnut-type mixing plate is disposed directly below the cone-type baffle element whereby when the fluid stream passes through the peripheral flow passage it flows about the fluid flow obstructors and then toward and through the flow passage of the mixing plate.

6. The baffle unit of claim 5 wherein the fluid flow obstructors on the downstream surface of the cone-type baffle element comprises a labyrinth of alternating ridges and grooves to angularly spread and mix the fluid streams flowing therethrough; a sieve plate is axially spaced apart from and downstream of the mixing plate, a downstream cone-type baffle element is disposed between the downstream sieve plate and the mixing plate, the apex of said cone being adjacent the sieve plate to define a flow space therebetween of increasing volumetric area extending outwardly from the axial center of said baffle element, the peripheral edge of the baffle element being spaced apart from the interior wall of the column to define a ring-like flow passage therewith and the upstream surface of said baffle element characterized by a labyrinth of alternating circumferential ridges and grooves, whereby the fluid streams flowing through the upstream sieve plate flow into the flow space and outwardly toward the peripheral edge of the upstream baffle element and through the ring-like flow passage, the velocity of the fluid being constant in any radial position on said cone surface, the fluid streams are then angularly spread while passing through the labyrinth of circumferential ridges and grooves and then through the central flow passage of the mixing space, and after flowing through the central flow passage they pass outwardly through the circumferential labyrinth of ridges and grooves on the downstream baffle element and through the peripheral flow passage therein and into the downstream flow space and out through the downstream sieve plate to provide a uniform pressure across the first and second sieve plates.

7. An improved column for the chromatographic separation of components from a fluid stream which comprises in combination:
 a column;
 separatory material within said column to selectively retard the flow of one or more chromatographic components flowing therethrough;
 a baffle unit to improve the resolution of the column which comprises:
 a first baffle means comprising a plurality of flow passages substantially uniformly distributed throughout,
 a second baffle means characterided by at least one flow passage toward the outer periphery thereof; and
 the first and second baffle means axially spaced apart and defining an empty flow space therebetween, the flow space characterized by an increasing volumetric flow space extending outwardly from the axial center of the baffle means whereby a fluid stream introduced generally axially into the baffle device flows into the flow space and outwardly at a substantially constant velocity in the flow space, and then exits from the baffle unit, the pressure across the baffle device being substantially uniform.

8. The column of claim 7 wherein the first baffle means is a sieve plate having a generally planar surface and is disposed upstream of the second baffle means and the second baffle means is a cone-type baffle element, the apex of which cone is adjacent the planar surface of the sieve plate, the peripheral edge of said baffle element spaced apart from the interior wall of the column to define a ring-like flow passage therewith.

9. The column of claim 7 which comprises at least a first and second column in serial relationship and one baffle unit is disposed upstream of the outlet of the first column and one baffle unit is disposed downstream of the inlet of the second column.

10. An apparatus for the chromatographic separation of fluid components in a fluid stream which comprises in combination:
 (a) a chromatographic column having separatory material therein;
 (b) means to introduce a fluid sample stream into said column;
 (c) means to introduce a fluid carrier stream into said column;
 (d) means to withdraw the components so separated from the column;
 (e) means to improve the resolving power of the column which means include a baffle unit which comprises:
 a first baffle means comprising a plurality of flow passages substantially uniformly distributed throughout, a second baffle means characterized by at least one flow passage toward the outer periphery thereof;
 the first and second baffle means axially spaced apart and defining an empty flow space therebetween, the flow space characterized by an increasing volumetric flow space extending outwardly from the axial center of the baffle unit whereby a fluid stream introduced generally axially into the baffle unit flows into the flow space and outwardly at a substantially constant velocity in the flow space and then exits from the baffle unit, the pressure across the baffle unit being substantially uniform.

11. The apparatus of claim 10 which includes means to detect the fluid components being withdrawn from the column and wherein the first baffle means is a sieve plate having a generally planar surface and is disposed upstream of the second baffle means and the second baffle means is a cone-type baffle element the peripheral edge of which is spaced apart from the interior wall of the column to define a ring-like flow passage therewith.

12. A method of separating a fluid stream into its chromatographic components in a chromatographic column which contains a baffle device and separatory material which comprises:
introducing a fluid sample stream into the column;
introducing a fluid carrier stream into the column to drive the fluid sample stream in an axial direction through the column across substantially the entire cross-sectional area thereof into an empty flow space defined by first and second baffles, the flow space characterized by an increasing volumetric flow space extending outwardly from the axial center of the baffles;
flowing the fluid streams in the flow space radially and outwardly toward the interior wall of the column at a constant velocity;
distributing the fluid streams from the interior wall of the column back into the separatory material of the column.

References Cited

UNITED STATES PATENTS 3,214,247  10/1965  Broughton _____ 55—67 XR
3,422,604  1/1969   Haase _____ 55—386

JAMES L. DECESARE, Primary Examiner